(12) United States Patent
Smith

(10) Patent No.: US 6,942,059 B2
(45) Date of Patent: Sep. 13, 2005

(54) COMPOSITE BANDWIDTH MARINE VIBROSEIS ARRAY

(75) Inventor: James MacDonald Smith, Richmond, TX (US)

(73) Assignee: WesternGeco, L.L.C., Houston, TX (US)

( * ) Notice: Subject to any disclaimer, the term of this patent is extended or adjusted under 35 U.S.C. 154(b) by 0 days.

(21) Appl. No.: 10/293,233

(22) Filed: Nov. 13, 2002

(65) Prior Publication Data

US 2004/0089499 A1 May 13, 2004

(51) Int. Cl.[7] .............................................. G01V 1/00
(52) U.S. Cl. .................................................... 181/110
(58) Field of Search ................................ 181/110, 101, 181/108, 109, 111, 112, 113–122, 106

(56) References Cited

U.S. PATENT DOCUMENTS

| | | | |
|---|---|---|---|
| 3,885,225 A | | 5/1975 | Anstey et al. |
| 4,295,213 A | | 10/1981 | Mifsud |
| H656 H | * | 7/1989 | Huizer et al. ................. 367/23 |
| 4,885,726 A | | 12/1989 | Myers |
| 4,914,636 A | | 4/1990 | Garrotta |
| 5,247,486 A | | 9/1993 | Regnault ...................... 367/23 |
| 5,335,208 A | * | 8/1994 | Sansone ....................... 367/49 |
| 5,545,858 A | * | 8/1996 | Sansone ...................... 181/122 |
| 5,924,049 A | | 7/1999 | Beasley et al. |
| 6,131,694 A | * | 10/2000 | Robbins et al. ............. 181/105 |

FOREIGN PATENT DOCUMENTS

WO    WO 01/16621    3/2001

OTHER PUBLICATIONS

E. Rietsch, "Vibroseis Signals With Prescribed Power Spectrum," *Geophysical Prospecting*, vol. 25, pp. 613–620.
PCT International Search Report dated Mar. 17, 2004; PCT/CA03/01740.
PCT Written Opinion dated Jul. 5, 2004; PCT/CA03/01740.

* cited by examiner

*Primary Examiner*—Kimberly Lockett
(74) *Attorney, Agent, or Firm*—WesternGeco,L.L.C.

(57) ABSTRACT

The present invention provides marine vibroseis methods and apparatus that operate in an acquisition time frame significantly shorter than current marine vibroseis acquisition methods and comparable to marine airgun seismic source acquisition, while providing data seismic energy comparable or superior to marine airgun seismic sources, by apportioning a desired vibroseis bandwidth signal over a plurality or multiplicity of vibroseis projectors (sources).

28 Claims, 12 Drawing Sheets

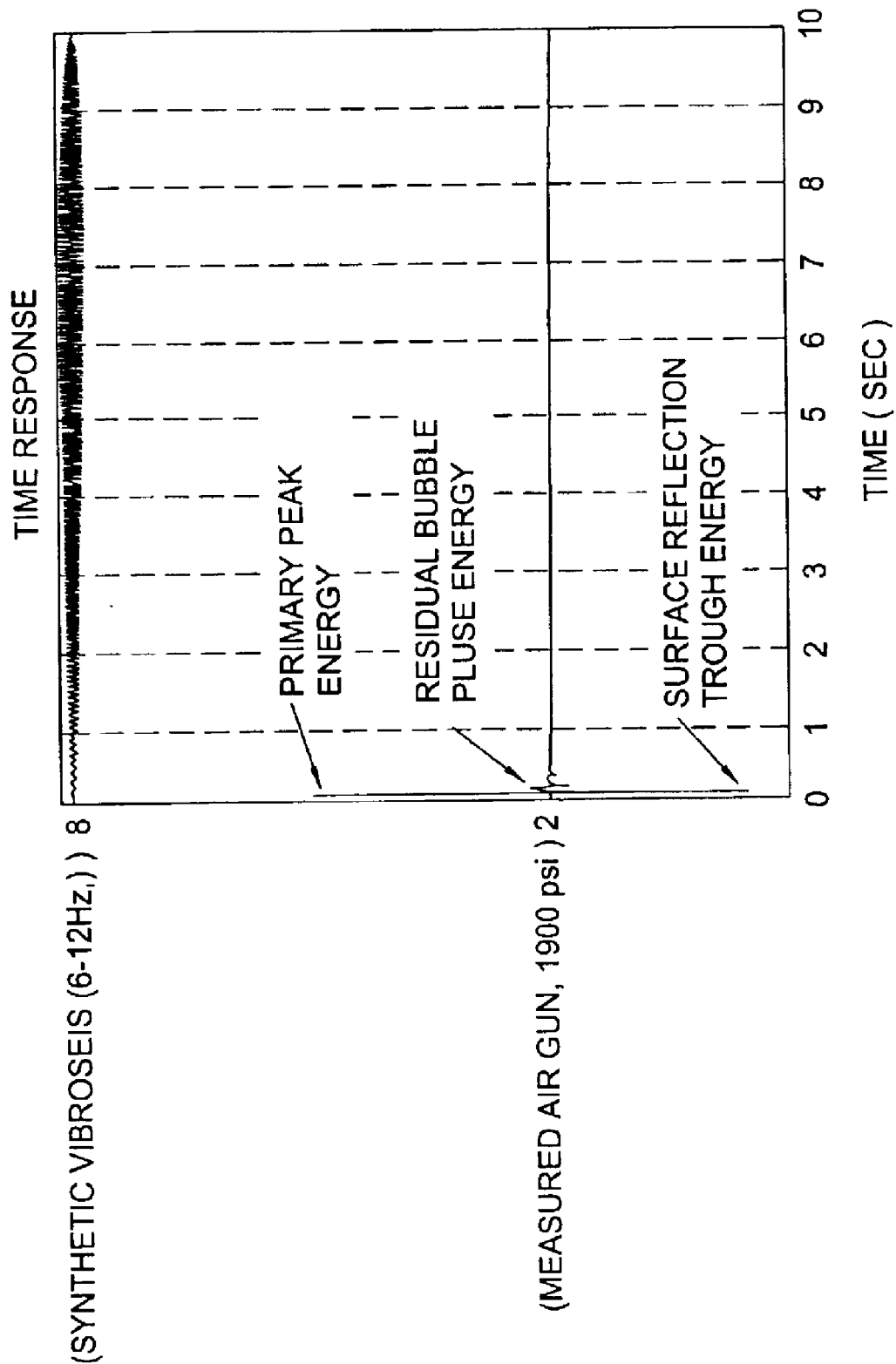

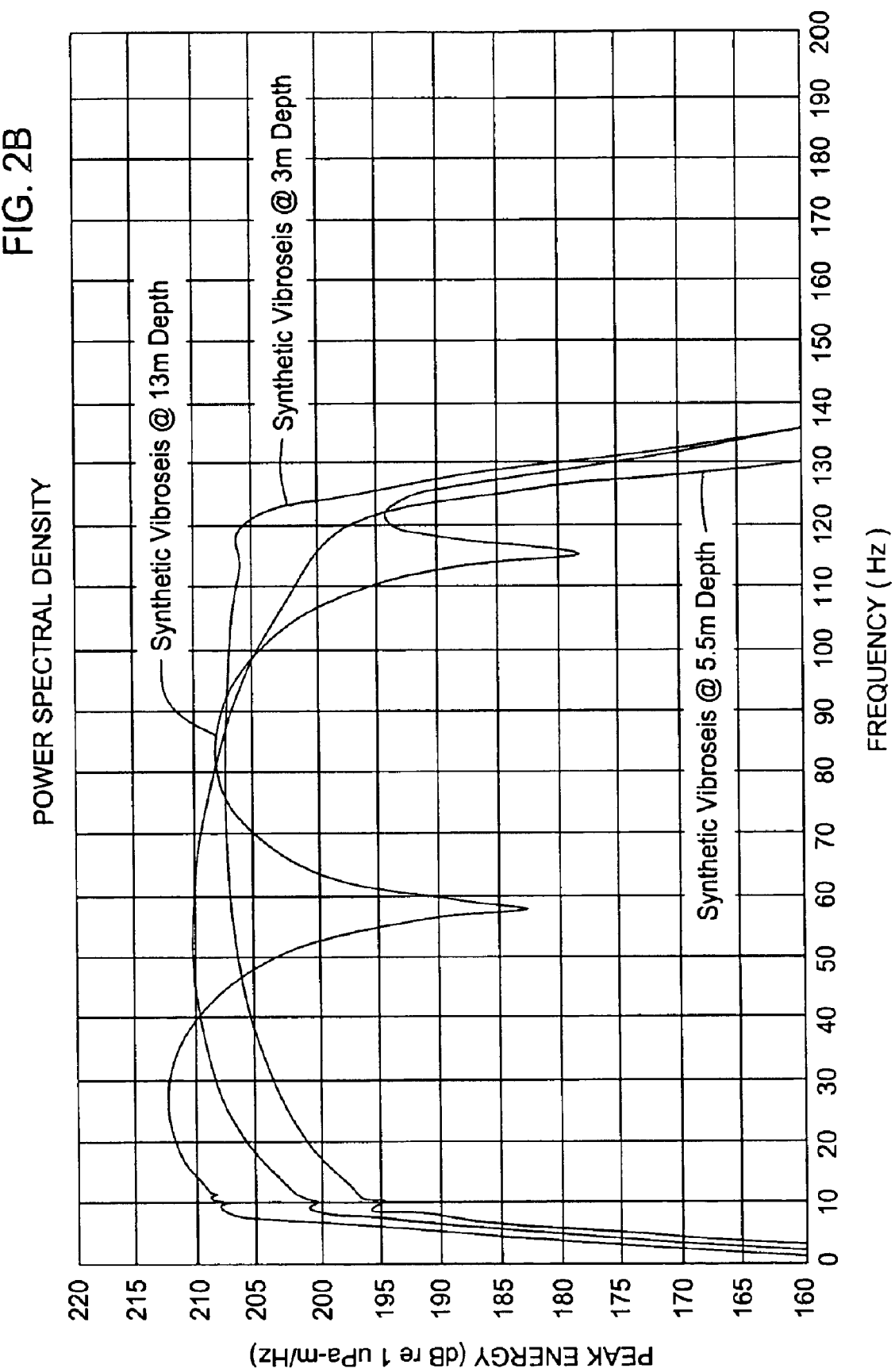

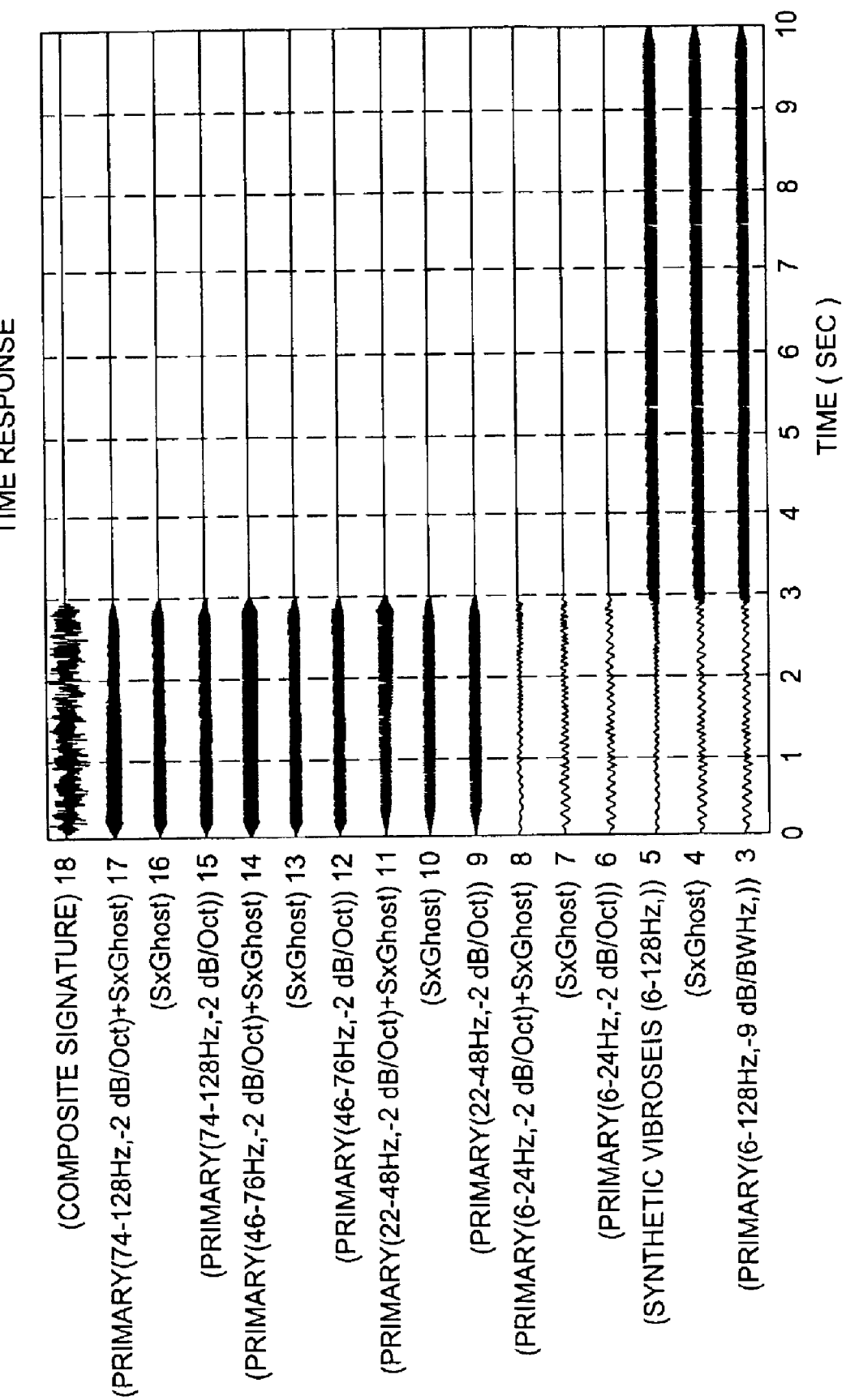

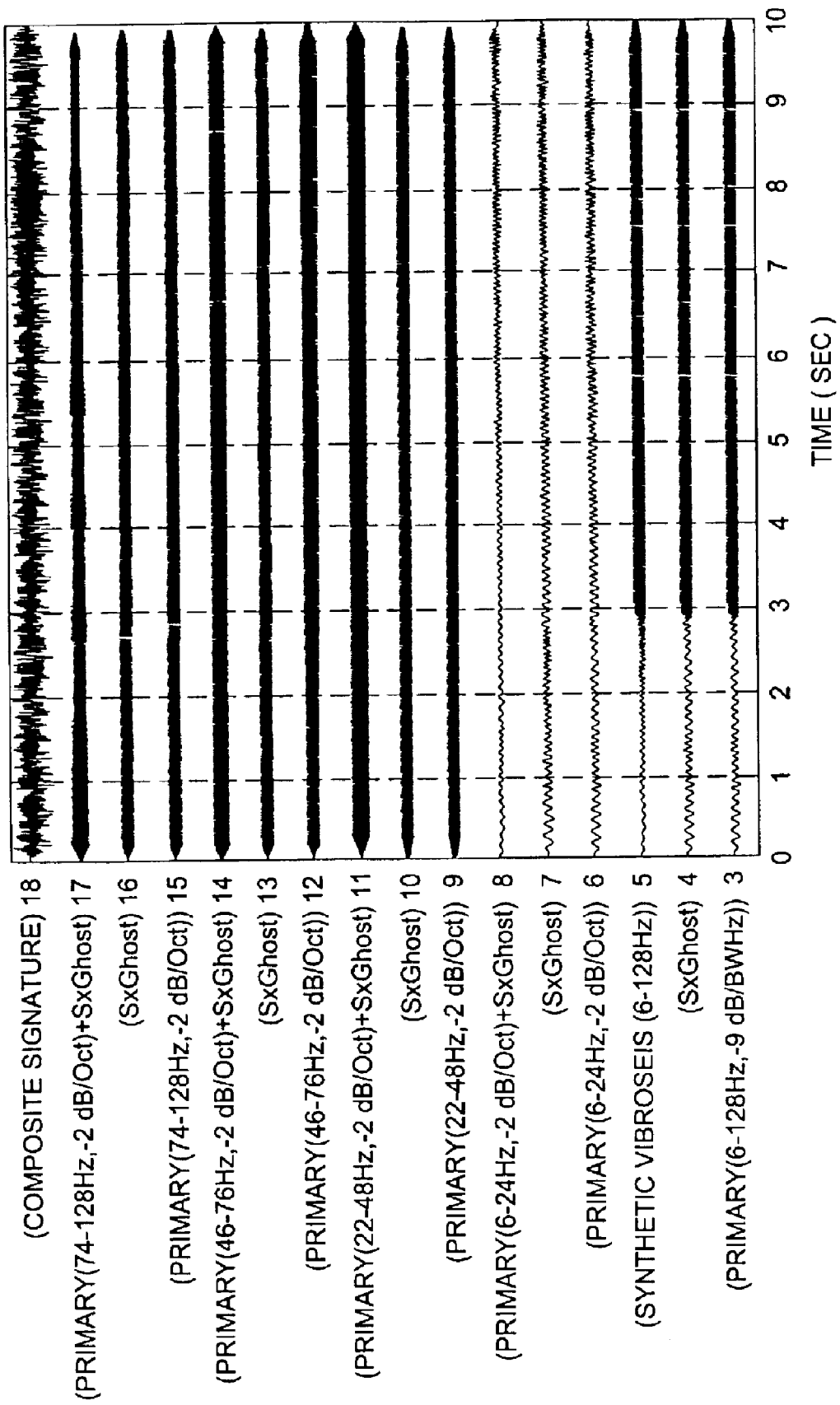

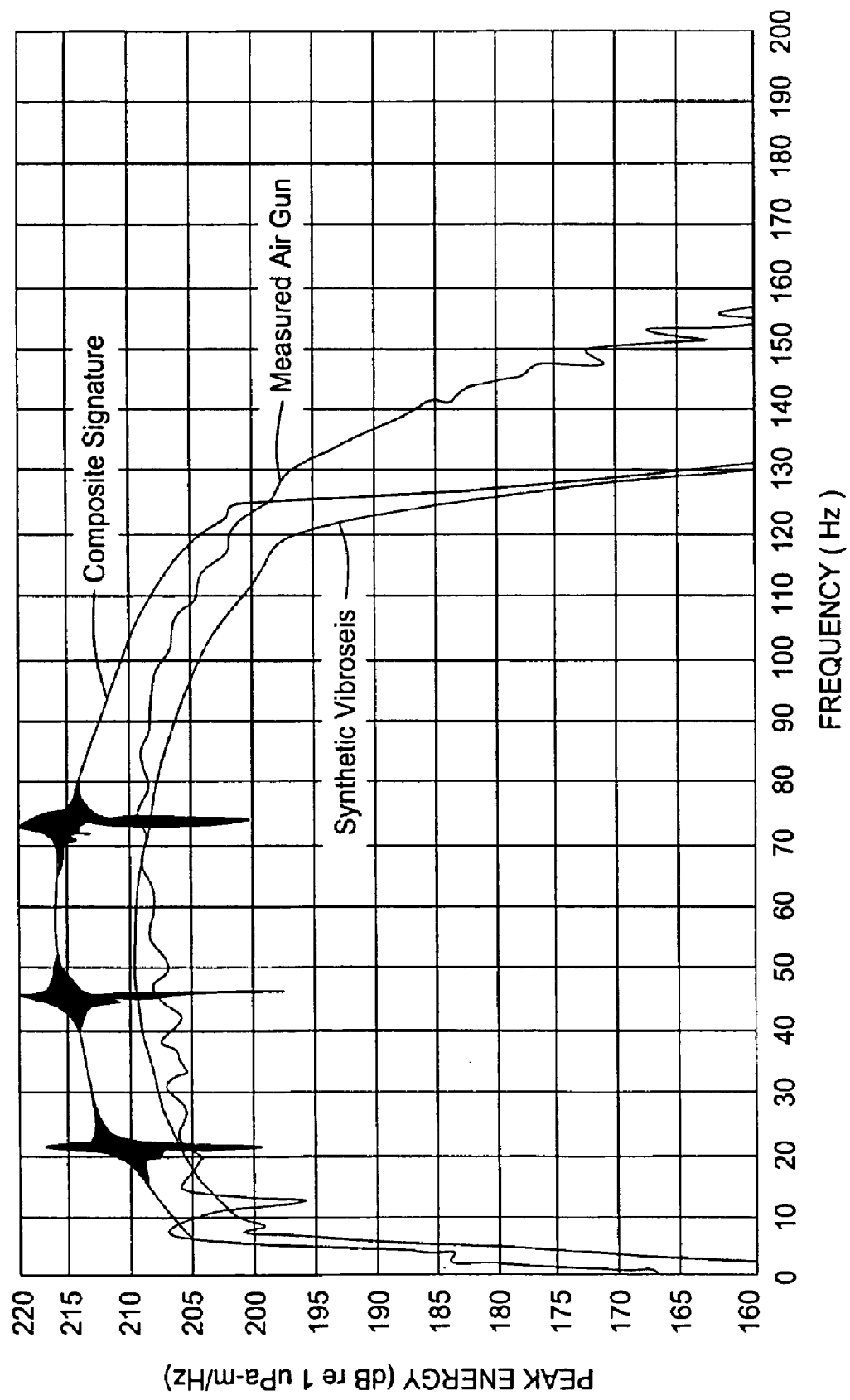

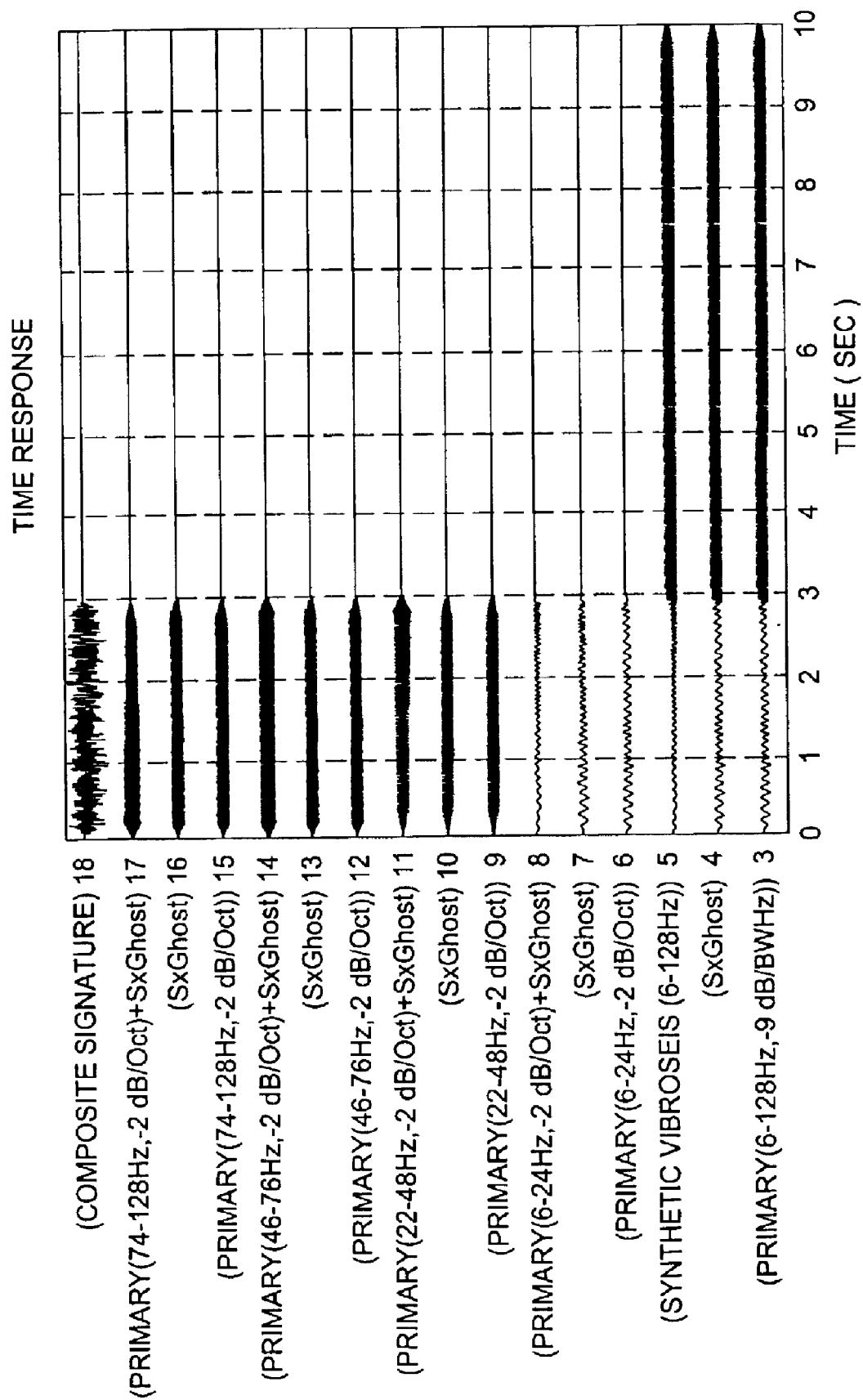

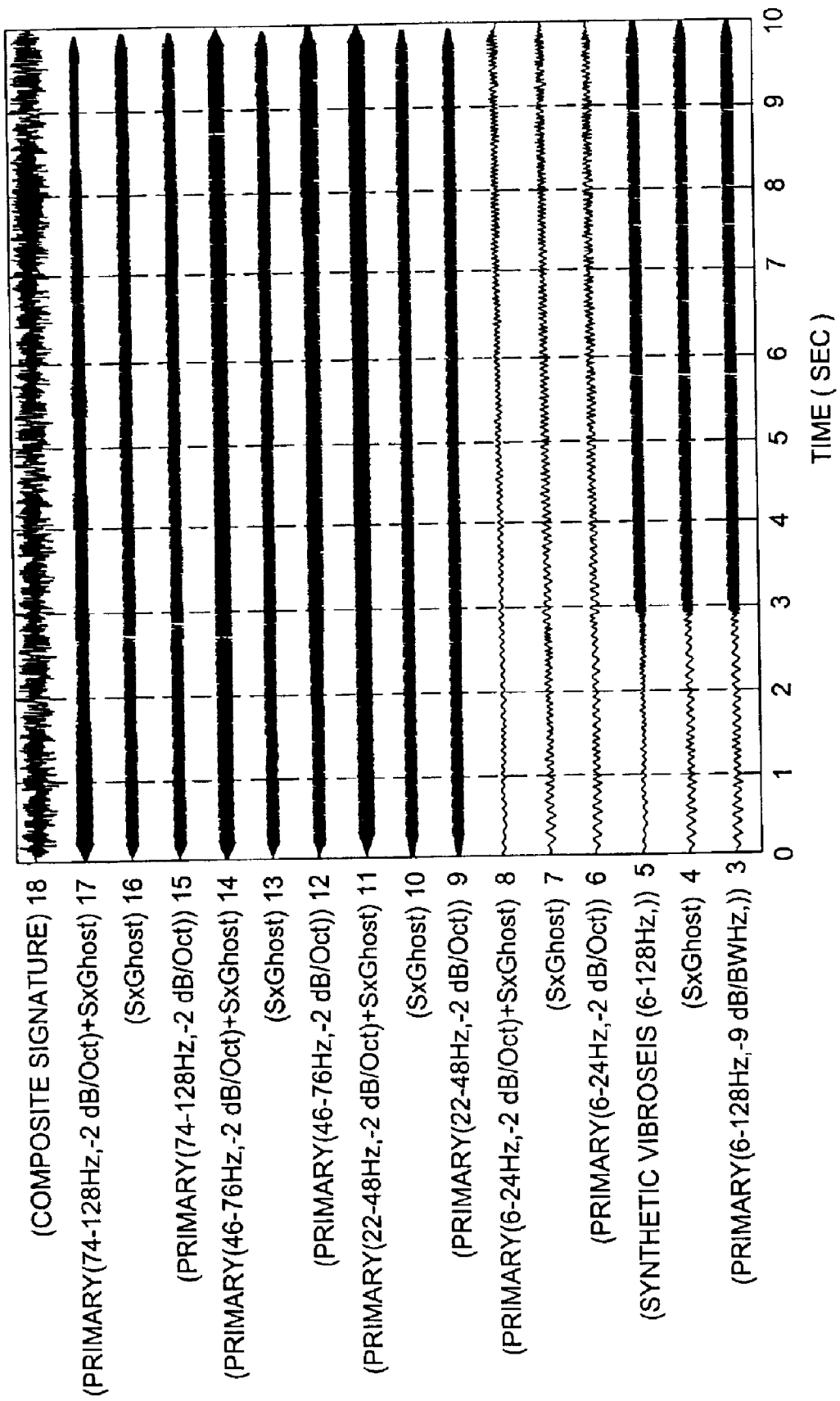

COMPOSITE BANDWIDTH MARINE VIBROSEIS ARRAY

BACKGROUND OF THE INVENTION

Field of the Invention

In the acquisition of seismic data, seismic waves are used to interpret subsurface geological formations. In the late 1950s, Conoco, Inc., pioneered the development of a new type of geophysical prospecting technique, now generally known as "vibroseis" prospecting. Vibroseis prospecting employs a seismic vibroseis source used to generate a controlled wavetrain that propagates through the earth to be detected by seismic detectors. Vibroseis sources emit an energized wavefield over a selected time period known as sweep time. Seismic detectors detect earth movements during sweep time plus during an additional time period commonly referred to as listen time. Typically, the energization takes the form of a sinusoidal wavefield of continuously varying frequency applied to the earth or a body of water during a sweep time lasting from about two to about 20 seconds or even more.

Marine vibroseis seismic sources offer an alternative to marine airgun seismic sources. However, there are problems with marine vibroseis sources that must be solved before marine vibroseis can be accepted as a global production seismic source. Specifically, marine vibroseis sources must produce data comparable or superior to airgun-acquired seismic data. In addition, marine vibroseis must operate in an acquisition time frame that will equal or exceed airgun production. Historically, data quality comparisons of the two source methods tend to show comparable or better data in shallower sections of stacked data for vibroseis methods, while deeper stack data appears superior when acquired by contemporary airgun methods.

Whereas an airgun signal is impulsive and produces required energy almost instantaneously, production of marine seismic vibroseis energy requires a vibroseis projector emit energy over a specified time period. This presents both operational and geophysical problems for marine vibroseis methods. The time incurred emitting vibroseis energy in a contiguous full bandwidth manner compared to the impulsive airgun source is significant and, in the absence of simultaneous acquisition techniques, slows the rate of data acquisition.

In addition, and in the case of continuous acquisition, the time spent emitting vibroseis energy causes a smearing effect on subsurface horizons due to vessel motion. The amount of smearing is affected by the velocity of the vessel and the amount of time spent emitting vibroseis energy. In addition to sub-surface smearing, Doppler corrections applied to vibroseis data to correct for vessel motion become more significant the longer the time spent emitting vibroseis energy.

A problem common to both sub-sea surface source methods (impulsive and vibroseis) is the attenuation of very low-frequency and high-frequency bandwidth energy. This attenuation is caused by destructive interference due to sea surface reflection, which is affected by the proximity of the towed subsurface source to the surface.

Thus, it is of interest in the art to provide marine vibroseis methods and apparatus that operate in an acquisition time frame comparable to marine airgun seismic sources, while providing data comparable or superior to marine airgun seismic sources.

SUMMARY OF THE INVENTION

The present invention provides a vibroseis projector array configuration and methods for marine vibroseis such that the required energy is emitted in a significantly abbreviated time period compared to prior art marine vibroseis techniques. In addition, in the present invention, attenuation of low and high frequencies due to surface reflections is partially or completely avoided. Furthermore, the present invention provides advantages for the fabrication and operation of vibroseis projectors. Specifically, the present invention provides for the division of a desired bandwidth over a plurality or multiplicity of projectors, all operating contemporaneously at different water depths, thus decreasing the time spent on emissions and minimizing surface reflection attenuations.

Thus, the present invention provides a method of marine vibroseis prospecting using an array of vibroseis sources comprising steps of, first, providing at least two vibroseis sources (collectively an array of vibroseis sources). Next, energy is emitted at a first frequency range from the first vibroseis source while energy is emitted at a second frequency range from the second vibroseis source. The energy emitted from the two sources is done so simultaneously or substantially so; however, the first frequency range and the second frequency range are not the same range. Finally, the frequencies are detected. In one embodiment, the first source emits energy at a low frequency and the second source emits energy at a high frequency. In a preferred embodiment, the sources are provided at depths that optimize gain from the surface reflection. Also, there may be a plurality or multiplicity of sources, emitting a multiplicity of signals at a multiplicity of depths.

In addition, the present invention provides a method for marine vibroseis prospecting comprising, first, providing at least two vibroseis sources constituting an array of vibroseis sources and apportioning a desired energy bandwidth frequency between the at least two vibroseis sources. Energy is then emitted from the first and second vibroseis sources substantially simultaneously; and, finally, detected. Again, there may be a plurality or multiplicity of sources, emitting a multiplicity of signals at a multiplicity of depths.

Also, the present invention provides an apparatus for emitting energy for marine vibroseis prospecting. The apparatus has a first vibroseis source to emit energy at a first frequency range for a first period of time; and at least a second vibroseis source to emit energy at a second frequency range substantially simultaneously with the first vibroseis source. The second period of time is substantially the same as the first period of time, but the first frequency range and the second frequency range are not the same.

BRIEF DESCRIPTION OF THE DRAWINGS

So that the manner in which the above recited features of the present invention can be understood in detail, a more particular description of the invention, briefly summarized above, may be had by reference to the embodiments of the invention which are described in the present specification and illustrated in the appended drawings. It is to be noted, however, that the specification and appended drawings illustrate only certain embodiments of this invention and are, therefore, not to be considered limiting of its scope of the invention may admit to equally effective embodiments.

FIG. 4(a) displays a pressure versus time response of far field signatures of synthetic vibroseis sources and FIG. 4(b) displays a power spectral density plot of far field signatures of synthetic vibroseis sources and a measured airgun source.

DETAILED DESCRIPTION OF THE INVENTION

Figure 1B:
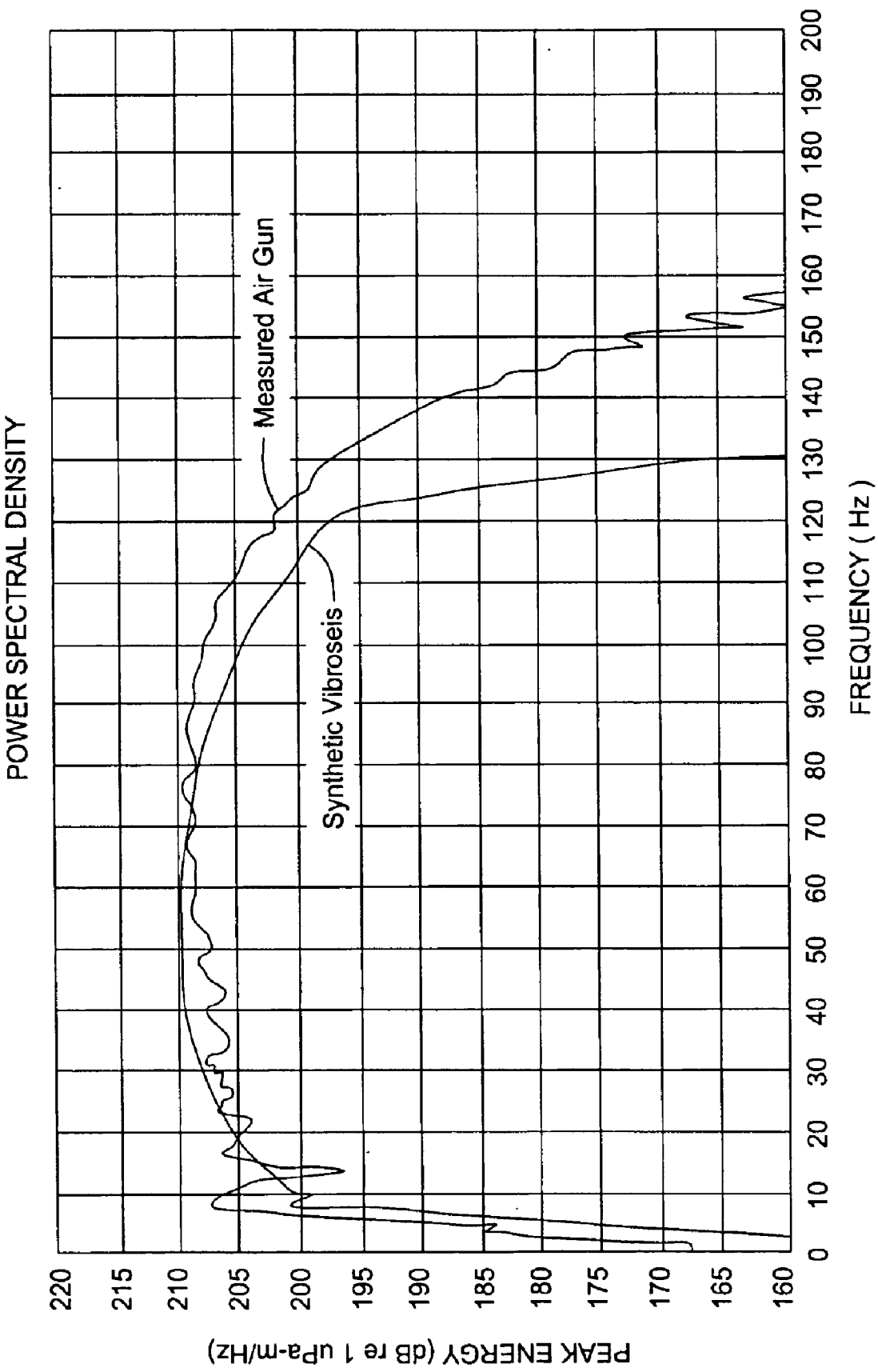
FIG. 1(a) displays a pressure versus time response and FIG. 1(b) displays a power spectral density plot of field signatures of a contemporary 100 Bar-M measured airgun source and a comparable energy synthetic vibroseis source.

Reference will now be made in detail to exemplary embodiments of the invention. While the invention will be described in conjunction with these embodiments, it is to be understood that the described embodiments are not intended to limit the invention solely and specifically to only those embodiments. On the contrary, the invention is intended to cover alternatives, modifications and equivalents that may be included within the spirit and the scope of the invention as defined by the attached claims.

The present invention provides an apparatus and method for apportioning a desired vibroseis bandwidth signal over a plurality or multiplicity of vibroseis projectors (sources). Three advantages of employing the apparatus and method of the present invention are, first, that time spent emitting a total desired bandwidth energy is decreased significantly from conventional vibroseis methods. The time decrease is generally proportional to the number of vibroseis projectors employed. Second, the emitted energy may be increased significantly, again substantially proportional to the number of projectors employed. Finally, the attenuation of very low-frequency and high-frequency bands due to surface reflection destructive interference may be alleviated, avoided or converted to constructive interference by optimizing the depth of operation of each projector or source (or by varying the depths of the projectors or sources while emitting the signal), in the array of projectors or sources, according to the bandwidth each is emitting.

Thus, the invention provides an apparatus and methods for employing a plurality or multiplicity of vibroseis projectors. The projectors operate simultaneously to form an array. For example, a simple embodiment of this invention is a configuration of two projectors, where one projector is assigned to emit a low-frequency bandwidth portion of a desired source signal and the other projector is assigned to emit a high-frequency bandwidth portion of a desired source signal. The apportioned bandwidth signals may have amplitude-tapered start and end frequencies, and have an overlap of frequencies or have no frequency overlap. The projectors operate simultaneously or nearly simultaneously with a common or near-common start time. The bandwidth is generally greater than 0 Hz and less than 300 Hz, more commonly between 6 Hz and 128 Hz. The duration of the signal is about 2 seconds to about 12 seconds.

At the desired output, bandwidth is apportioned between the two projectors and the apportioned bandwidths are emitted contemporaneously. The time spent producing the desired energy is reduced from prior art vibroseis methods where the entire desired bandwidth is produced contiguously by a single projector or source or by two or more projectors or sources emitting the entire bandwidth. Thus, in the case of a linear swept signal where two projectors deliver an apportioned bandwidth and where the summation of the apportioned bandwidth energy is comparable to a single contiguous bandwidth emission, the time spent delivering the required energy is approximately half that of the contiguous desired bandwidth emission, with variations depending on the frequency overlap of the composite bandwidths, the end tapers, and the surface reflection energy.

Another advantage of apportioning bandwidth is that the fabrication of the vibroseis projectors is simplified. Typically, there is an issue with fabricating projectors that produce seismic energy at low frequency bands of, e.g., 5 to 20 Hz. By apportioning the low frequency band to a single vibrator unit and applying a non-linear sweep, the dwell time in the low frequency band is greatly increased, which builds energy in this bandwidth and allows for implementation of a size- or stroke-constrained vibrator that provides marginal low frequency energy that can be accumulated to a desired energy over time. In addition, should it be desirable to increase low frequency energy, it is possible to add another vibrator and re-apportion the bandwidth assignment such that the sum of the low frequency vibrators provide the desired energy. One skilled in the art understands that though this principle is discussed in the context of low frequency bands herein, this principle may be applied to any portion of the desired bandwidth.

In another embodiment of the present invention, each element of the sub-surface marine vibroseis array is operated at an optimized depth that alleviates or avoids attenuation of any portion of the emitted bandwidth caused by ensuing surface reflection energy. Marine sources (airgun and vibroseis) generally are operated at depths that minimize or tolerate the effect of destructive interference caused by the surface reflection on the composite signal. Destructive interference from the surface reflection occurs at the low-end frequency band and at regular high-frequency bands. In between the destructive interference bands, constructive interference frequency bands occur whereby the surface reflection adds desirable energy to the primary energy. In order to move the high-frequency attenuation bands to a higher frequency and, thus, outside of the useable seismic signal bandwidth, the source can be operated at a shallower depth. However, moving to a shallower depth has a negative effect on low-end bandwidth frequencies as attenuation is increased in the low-end band. On the other hand, if the seismic source is operated at a deeper depth in order to alleviate low-end frequency attenuation, then high-frequency attenuation occurs which degrades the high end of the seismic signal. This phenomenon cannot be alleviated in the impulsive airgun source as the impulsive source bandwidth cannot be apportioned. Similarly, vibroseis projector arrays that emit the entire desired bandwidth contiguously are also subject to the same problem.

The present invention, however, provides that the desired bandwidth be divided or apportioned amongst a plurality or multiplicity of projectors allowing for particular apportioned bandwidths to be emitted at particular depths-of-operation. Thus, low-frequency bandwidth projectors in the array may be operated at a deeper depth than the higher frequency bandwidth projectors, alleviating low bandwidth attenuation caused by an ensuing ghost reflection energy when low frequencies are emitted too near the surface reflector. In turn, higher frequency band-apportioned projectors are operated at a shallower depth than the lower frequency band projectors, thus alleviating or avoiding high-frequency attenuation in the seismic bandwidth. The high-frequency band projectors will not project low band frequencies that may be attenuated by the nearer surface reflector.

Thus, the optimization of operating depths of the projectors of a marine vibroseis array according to apportioned bandwidth yields a powerfully enhanced amplitude spectrum in the composite far field signature. Furthermore, the time incurred to emit desired energy is reduced significantly from conventional vibroseis emission methods.

EXAMPLE 1

FIG. 1 displays charts of far field signatures for a contemporary 100 Bar-m measured airgun array and a comparable energy synthetic vibroseis source. FIG. 1(a) displays a pressure versus time response of the far field signatures and FIG. 1(b) displays a spectral response, called a power spectral density (PSD) plot, of the far field signatures. Both signatures contain the same amount of energy (approximately 14 $Bar^2$-s). The synthetic vibroseis signature was created from a 6 Hz to 128 Hz non-linear sweep of 10-second duration with 0.2 second cosine end tapers, where operation is simulated at a depth of 5.5 meters.

The measured airgun signature was acquired from an airgun array operating at a depth of 4.7 meters and at 1900 PSI. Comparing the signatures in the time response chart (FIG. 1(a)), the measured airgun signature is characterized by short duration (0.4 seconds) and high amplitude (50.0 Bar-m) energy, whereas, the synthetic vibroseis signature is characterized by long duration (10 seconds) and low amplitude (1.208 Bar-m) energy. Regarding the PSD chart (FIG. 1(b)), note the higher spectral level of the airgun at very low frequencies and the accompanying large ripple effect due to the residual bubble energy. The airgun signature is affected by low-frequency attenuation, but the residual bubble energy boosts the airgun energy in this band (airgun energy at 14.29 $Bar^2$-s). The synthetic vibroseis spectral level is smooth, but shows the attenuation effect of the surface reflection in both the low- and high-frequency bands, while the middle band frequencies are gained by the surface reflection, producing the smooth bulging spectral shape (synthetic vibroseis energy equal to 14.1 $Bar^2$-s). There is no residual bubble pulse in vibroseis sources, thus the significant ripple effect evident in the airgun spectrum is absent in the vibroseis spectrum.

The time duration of the vibroseis emission affects both operations and data acquisition when operated as in typical prior art methods. The longer the vibroseis energy is emitted, the more significant the issues. For example, there will be mid-point smearing incurred over the emission time and Doppler shift solutions may be subject to greater error. Furthermore, the vibroseis technique of cross correlation forces the raw seismic record to be significantly longer than a raw airgun record, which implicates an attendant decrease in production. Such a decrease depends on the record length required and the time duration of the vibroseis emission. Thus, the shorter but comparable energy vibroseis emission of the present invention provides significant advantages in optimizing geophysical solutions and operational methods.

EXAMPLE 2

Figure 2A:
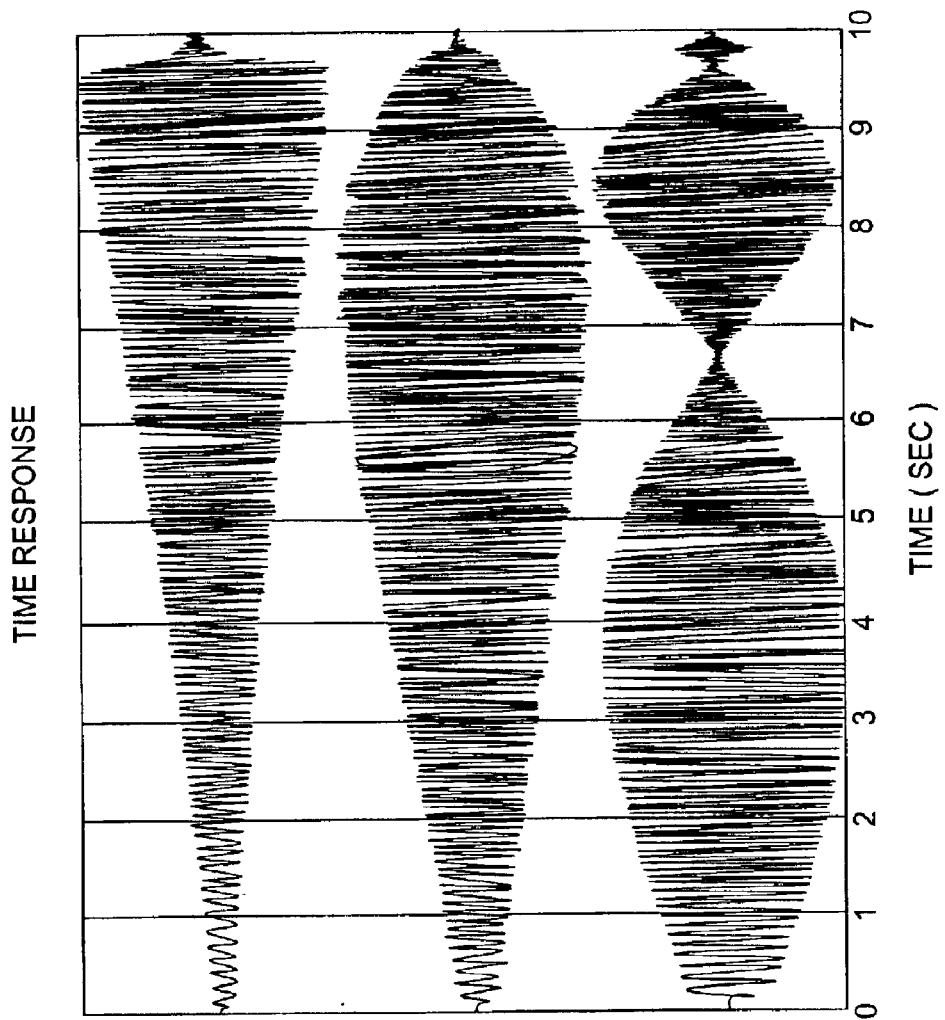
FIG. 2(a) displays a pressure versus time response and FIG. 2(b) displays a power spectral density plot of field signatures of synthetic vibroseis sources.

FIG. 2 displays charts of three synthetic far field vibroseis signatures. FIG. 2(a) is the time response chart and FIG. 2(b) is the spectral response of the far field signatures. The figures demonstrate the effects of surface reflection energy and depth of operation on vibroseis signatures. Each signature has a common 10.0 second sweep (6 Hz to 128 Hz non-linear sweeps with 0.2 second tapers) and a common source level (1.208 Bar-m), but they have different depths of operation. Note that the differences in the far field signatures are significant.

Regarding the time response chart (FIG. 2(a)), the 3.0 meter depth-of-operation signature has the highest amplitude at the highest frequencies (at 10 seconds) with an average energy of 9.44 $Bar^2$-s, and has the lowest amplitude at the lowest frequency (at 0.0 seconds). Similarly, the 5.5 meter depth of operation signature has a low amplitude near 0.0 seconds, a high amplitude near 8 seconds, and attenuating amplitude through 10.0 seconds with an average energy of 14.1 $Bar^2$-s. Note the lowest amplitude (other than 0 amplitude) on the 5.5 meter depth of operation signature is lower than the greatest amplitude on the 3 meter depth of operation signature. Further note that the higher frequency amplitudes are attenuated due to high-frequency destructive interference at the end of the sweep on the 5.5 meter depth-of-operation signature. Such attenuation of high-frequency amplitudes is clearly avoided on the 3.0 meter depth of operation signature.

Also consider the 13 meter depth of operation signature in the time response chart. The low-frequency amplitude attenuation at the start of the signature is significantly alleviated compared to the other two signatures; however, there is a high-frequency notch (100% attenuation) cutting into the energy at 6.75 seconds and again at 9.7 seconds. The average energy is 14.19 $Bar^2$-s. Similar observations can be made when inspecting the PSD plot (FIG. 2(b)), where amplitude (converted to power units) as a function of frequency can be appraised in dB levels. Low band frequencies of 6 to 40 Hz show the 13.0 meter depth of operation signature to be, on average, at least 5 dB higher than the other signatures. Mid-band frequencies of 40 to 80 Hz show the 5.5 meter depth of operation signature to be, on average, at least 3 dB higher than the other signatures. High-band frequencies of 80 to 120 Hz show the 3.0 meter depth of operation signature to be, on average, 4 dB higher than the other two signatures.

In summary, then, it can be stated in general that the shallower the depth of operation of marine seismic sources, the greater the avoidance of high-frequency attenuation within the seismic bandwidth, but the greater the attenuation of low frequencies within the seismic bandwidth. Conversely, the deeper the depth of operation of a marine seismic source, the greater the alleviation of low-frequency attenuation in the seismic bandwidth and the greater the occurrence of high-frequency attenuation in the seismic bandwidth. Thus there is a clear advantage to using this embodiment of the present invention, where the required bandwidth is apportioned or divided over several vibroseis sources and the individual sources are operated at depths that alleviate or avoid the attenuation effects of their respective bandwidths. Such apportionment cannot be accomplished with impulsive sources such as airgun arrays. In addition, it should be recognized that in the methods of the present invention, the amount of time required to emit the desired energy is abbreviated significantly.

EXAMPLE 3

Figure 3B:
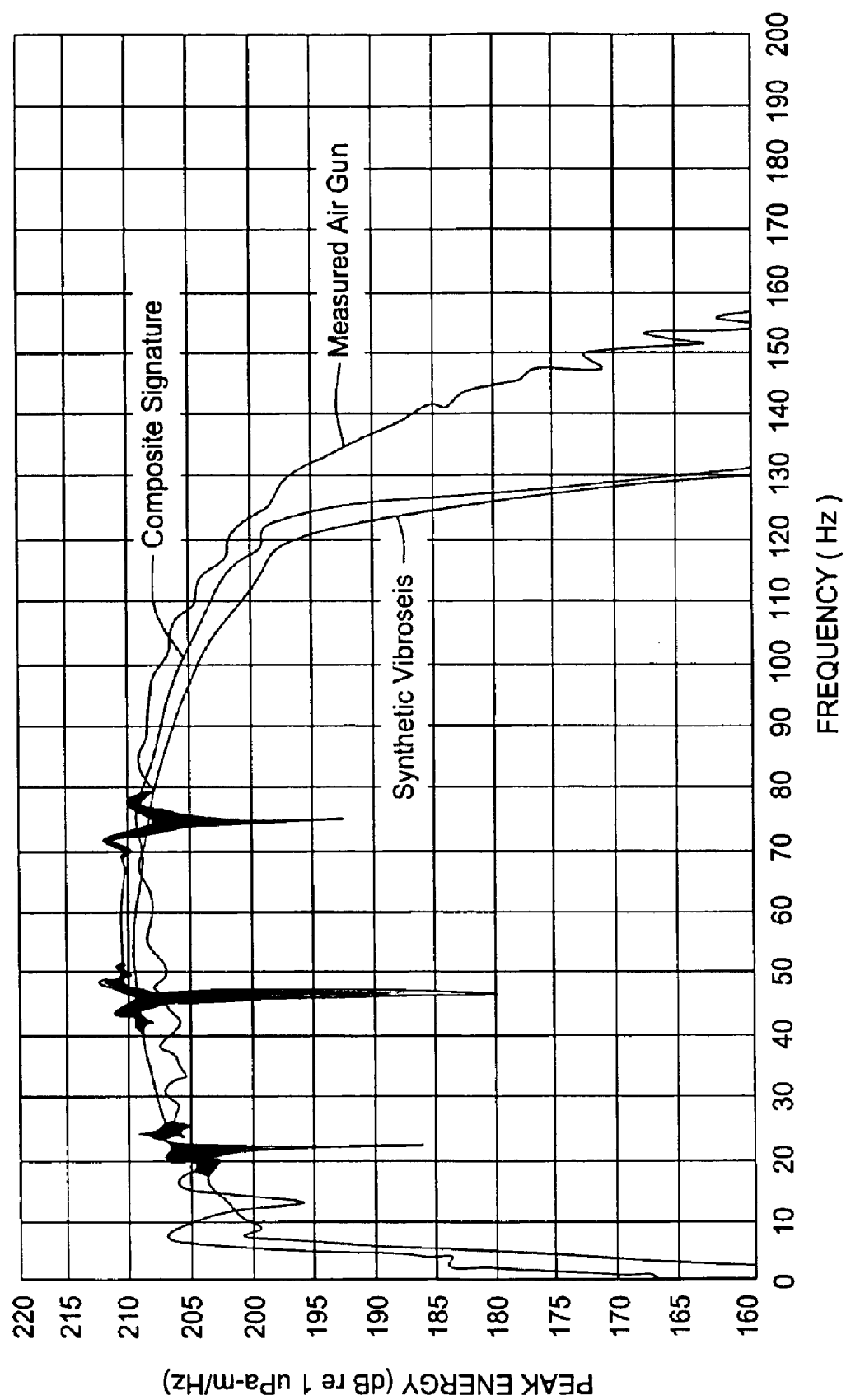
FIG. 3(a) displays a pressure versus time response of far field signatures of synthetic vibroseis sources and FIG. 3(b) displays a power spectral density plot of far field signatures of synthetic vibroseis sources and a measured airgun source.

FIG. 3 displays charts of time response and PSD that demonstrate that the use of multiple projectors shorten emission time as compared with the emission time required for a comparable single energy vibroseis source of the same bandwidth. The time response chart (FIG. 3(a)) displays the synthetic far field signatures of primary, surface reflection (the source ghost), the superposition of primary and surface reflection and the composite energy of five sub-surface vibroseis projectors. Each signature is numbered on the vertical axis as 3–18. Signatures 3–5 are the primary, the surface reflection, and the superposition of the primary and surface reflection of a source emitting a 6 Hz to 128 Hz non-linear sweep over 10.0 seconds at a source level of 1.208 Bar-m and an operation depth of 5.5 meters. Signature 5 is the synthetic far field signature that is referenced in FIGS. 1 and 2 and shaded in all PSD plots. The signatures numbered 6–18 represent the synthetic output of four sub-surface vibroseis projectors that are configured as an array, emitting energy contemporaneously and all operating at a depth of 5.5 meters and a source level of 1.208 Bar-m. Each array projector emits a portion of 6 Hz to 128 Hz bandwidth over a 3.0 second duration.

Signatures 6–8 represent the primary, surface reflection, and composite energy of a sub-surface vibroseis source emitting a 6–24 Hz non-linear sweep. Similarly, signatures 9–11 are synthetics of a 22–48 Hz non-linear sweep, signatures 12–14 are synthetics of a 46–76 Hz non-linear sweep, and signatures 15–17 are synthetics of a 74–128 Hz non-linear sweep. Signature 18 is the synthetic far field signature of the array of projectors, which is a superposition of the individual signatures.

The display of the power spectral density plot in FIG. 3(*b*) shows the far field signatures of the 100 Bar-m airgun referenced in FIG. 1 (with an energy of 14.29 Bar$^2$-s), the synthetic far field signature of the vibroseis 6 Hz to 128 Hz contiguous emitted energy over 10.0 seconds shown as signature 4 in the time response chart (with an energy of 14.10 Bar$^2$-s), and the 6 Hz to 128 Hz composite vibroseis bandwidth far field signature emitted over 3.0 seconds shown in the time response chart as signature 18 (with an energy of 16.1 Bar$^2$-s). By inspection, it should be noted that all three signatures are comparable in spectral levels and total energy, thus demonstrating one of the advantages of the present invention; that is, that time spent emitting total desired bandwidth energy (3.0 seconds for the composite) is decreased significantly from conventional prior art vibroseis methods (10.0 for the prior art synthetic vibroseis), and the decrease is proportional to the number of vibroseis projectors employed.

EXAMPLE 4

FIG. 4 displays time response (FIG. 4(*a*)) and PSD charts (FIG. 4(*b*)) of the same signal energy presented in FIG. 3 except that the emission duration of the four projectors in the array has been changed. In FIG. 4, the composite array projector emission is 10.0 seconds in duration, which is the same as the emission time for the contiguous synthetic vibroseis 6 Hz to 128 Hz signature. The duration times are noted in the time response chart.

The PSD plot of FIG. 4(*b*) shows the same signatures that were presented in the FIG. 3 PSD plot. In this case it should be noted that the spectral level and total energy (PSD chart) of the composite bandwidth signature is significantly higher than the other two signatures. The energy for the airgun signature is 14.29 Bar$^2$-s, the energy for the contiguous synthetic vibroseis signature is 14.10 Bar$^2$-s, and the energy for the composite array signature is 57.32 Bar$^2$-s. Thus, another advantage of the invention is shown; that is, emitted energy is increased significantly over the bandwidth proportional to the number of projectors employed. Thus, where FIG. 3 demonstrates that the present invention can deliver energy levels comparable to prior art methods in a reduced timeframe, FIG. 4 demonstrates that if the timeframe is kept the same, the present invention emits a significantly increased amount of energy.

EXAMPLE 5

Figure 5B:
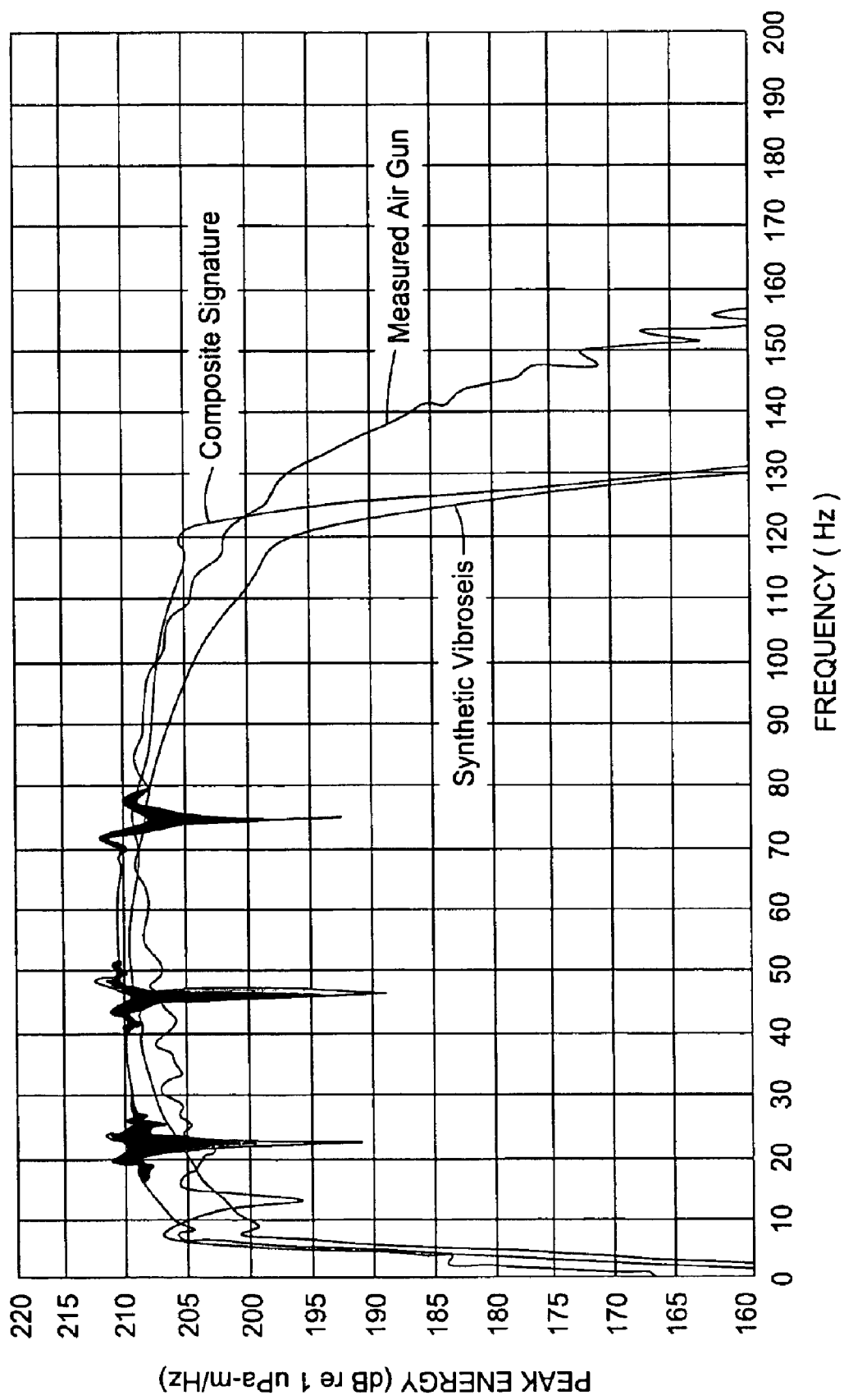
FIG. 5(a) displays a pressure versus time response of far field signatures of synthetic vibroseis sources and FIG. 5(b) displays a power spectral density plot of far field signatures of synthetic vibroseis sources and a measured airgun source.

FIG. 5 displays time response (FIG. 5(*a*)) and PSD plots (FIG. 5(*b*)) of the same synthetic source energy presented in FIG. 3. However, in FIG. 5, the depth of operation of the projectors operating in the array has been altered individually such that attenuation caused by destructive interference of the surface reflection is alleviated. Table 1 lists parameters used for the synthetic signatures for the two synthetic vibroseis sources in FIG. 5.

TABLE 1

| Source | Signatures | Sweep (Hz) | Pre Amp Gain (dB/Oct) | Source Level (Bar-m Peak) | Emission Length(s) | Depth of Operation (m) |
|---|---|---|---|---|---|---|
| 1 | 3–5 | 6–128 | −3 | 1.208 (primary) | 10 | 5.5 |
| 2 | 6–8 | 6–24 | −2 | 1.208 (primary) | 3 | 11 |
| 2 | 9–11 | 22–48 | −2 | 1.208 (primary) | 3 | 9 |
| 2 | 12–14 | 46–78 | −2 | 1.208 (primary) | 3 | 6 |
| 2 | 15–17 | 76–128 | −2 | 1.208 (primary) | 3 | 4.5 |
| 2 | 18 | Superposition (8 + 11 + 14 + 17) | | 2.772 (rms) 7.67 (peak) | | |

The results depicted in FIG. 5 demonstrate the boost in spectral level due to the depth optimization of each of the projectors in the four element array. The composite signature energy (21.8 Bar$^2$-s), consisting of the four projectors in an array operating at various depths of operation, is 50% higher in total energy than the other two signatures (approximately 14 Bar$^2$-s). The energy computations were performed at various bandwidths and are transposed to Table 2 for a clearer explanation.

TABLE 2

| | Energy within Bandwidth Partitions (Bar$^2$-s) from FIG. 5 Power Spectral Density Plot | | | | |
|---|---|---|---|---|---|
| Signature | Full Bandwidth | 6–22 Hz | 22–48 Hz | 48–78 Hz | 78–128 Hz |
| 100 Bar-m Measured Air Gun signature (dots) | 14.294 | 1.038 | 1.996 | 6.264 | 4.927 |
| 10 second, Contiguous Bandwidth Vibroseis Signature (dashes) | 14.100 | 0.616 | 2.909 | 7.895 | 2.706 |
| 3 second, Composite Bandwidth Vibroseis Signature (line) | 21.784 | 1.996 | 4.792 | 9.483 | 5.547 |

The results shown in Table 2 demonstrate a substantial gain in energy in each of the bandwidth partitions of the composite bandwidth vibroseis signature due to optimized depth of operation of the projectors emitting the apportioned bandwidth frequencies. Thus, the results in FIG. 5 verify three advantages of the present invention; that is, first, that time spent emitting total desired bandwidth energy is decreased significantly from conventional vibroseis methods and is proportional to the number of vibroseis projectors employed; second, that emitted energy is increased significantly over the bandwidth proportional to the number of projectors employed; and, finally, the attenuation of very low-frequency and high-frequency bands, due to surface reflection destructive interference, is alleviated, avoided or converted to constructive interference by optimizing the depth of operation of each projector according to the bandwidth each projector is emitting.

EXAMPLE 6

Figure 6B:
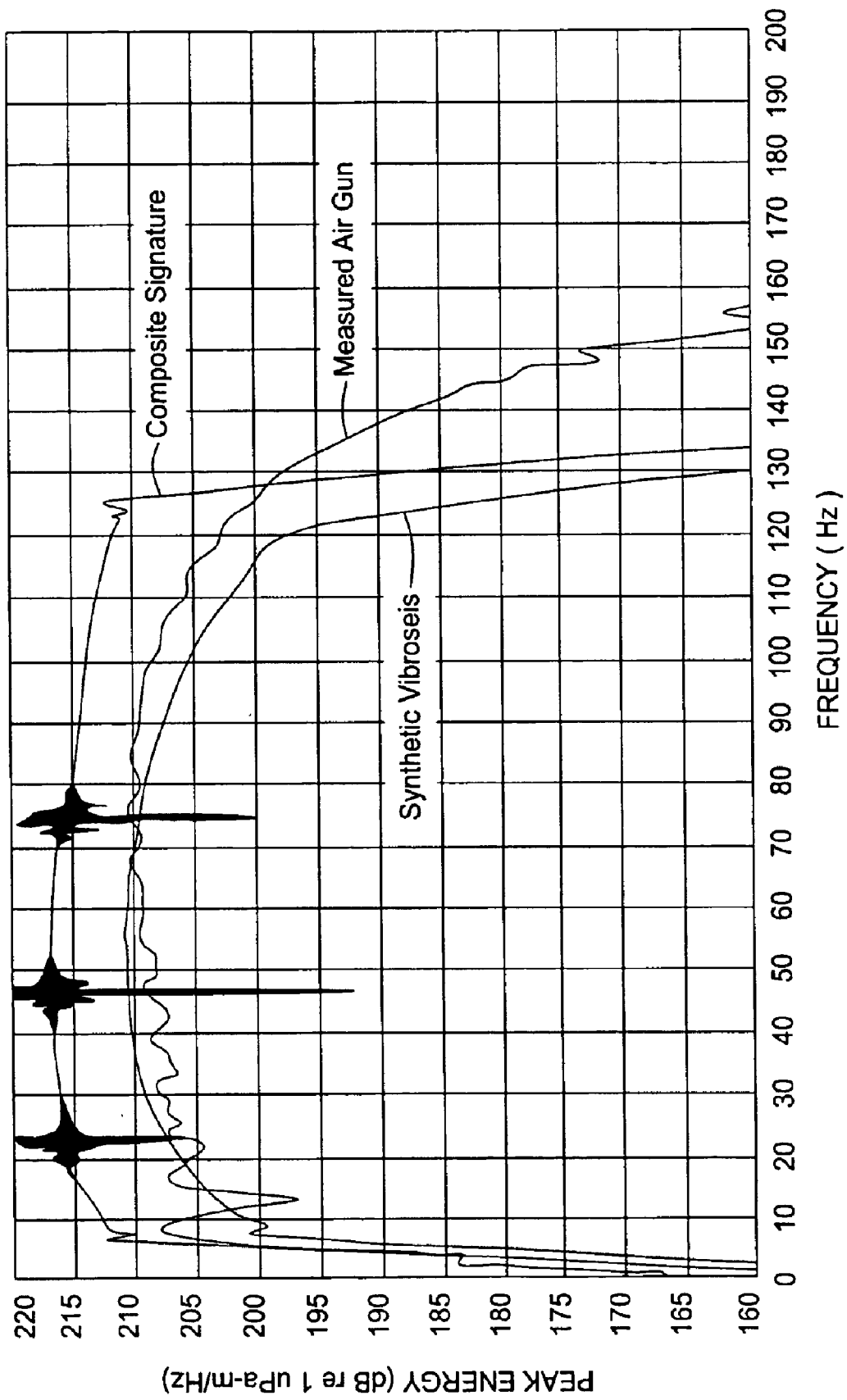
FIG. 6(a) displays a pressure versus time response of far field signatures of synthetic vibroseis sources and FIG. 6(b) displays a power spectral density plot of far field signatures of synthetic vibroseis sources and a measured airgun source.

FIG. 6 displays time response (FIG. 6(a)) and PSD plots (FIG. 6(b)) of the same signal energy displayed in FIG. 4; however, the depth of operation of the individual projectors and the array of projectors has been altered to that of FIG. 5. Noting the PSD plot in FIG. 6(b), it can be seen that the total energy of the composite bandwidth signature is almost 5.5 times higher than the two other signatures (76.97 for the composite signature versus approximately 14.2 for the airgun and contiguous synthetic vibroseis signatures). Compare this result with the PSD plot of FIG. 4(b) and the energy boost due to optimization of depth of operation is clearly demonstrated. This result, thus, verifies two advantages of the present invention; that is, emitted energy is increased significantly over the bandwidth proportional to the number of projectors employed, and the attenuation of very low-frequency and repeated high-frequency bands, due to surface reflection destructive interference, is alleviated by optimizing the depth of operation of each projector according to the bandwidth each projector is emitting. FIGS. 3–6(b) show power spectral density plots of composite density signatures that have a noticeable and severe rippling effect at overlapping bandwidths. These zones can be smoothed to the local pervasive spectral level with tapers computed appropriately to provide smooth transition between apportioned bandwidths.

While the foregoing Examples are directed to preferred embodiments of the present invention, other and further embodiments of the invention may be devised without departing from the basic scope thereof, and the scope should be determined from the claims that follow.

What is claimed is:

1. A method of marine vibroseis prospecting using an array of vibroseis sources comprising:
   providing at least first and second vibroseis sources at different depths, wherein the at least first and second vibroseis sources constitute the array of vibroseis sources;
   apportioning a desired frequency bandwidth into a lower frequency range and a higher frequency range;
   emitting energy at the lower frequency range from the first vibroseis source;
   substantially simultaneously emitting energy at the higher frequency range from the second vibroseis source, wherein the first frequency range and the second frequency range are substantially different; and
   detecting the emitted energies.

2. A method of marine vibroseis prospecting using an array of vibroseis sources comprising:
   providing at least first and second vibroseis sources, wherein the at least first and second vibroseis sources constitute the array of vibroseis sources;
   emitting energy at a first frequency range from the first vibroseis source;
   substantially simultaneously emitting energy at a second frequency range from the second vibroseis source, wherein the first frequency range is a low frequency range and the second frequency range is a higher frequency range; and
   detecting the emitted frequencies.

3. The method of marine vibroseis prospecting of claim 2, wherein the providing step further includes providing the at least first and second vibroseis sources at different depths.

4. The method of marine vibroseis prospecting of claim 3, wherein the first vibroseis source is provided at a lower depth than the second vibroseis source.

5. The method of marine vibroseis prospecting of claim 1, wherein there is no overlap between the first frequency range and the second frequency range.

6. The method of marine vibroseis prospecting of claim 1, wherein there is overlap between the first frequency range and the second frequency range.

7. The method of marine vibroseis prospecting of claim 1, wherein the sum of the first and second frequency ranges spans from above 0 Hz to about 300 Hz.

8. The method of marine vibroseis prospecting of claim 1, wherein times for emitting the first frequency range and the second frequency range are substantially equal.

9. The method of marine vibroseis prospecting of claim 8, wherein the times are between about 2 seconds and about 12 seconds.

10. A method of marine vibroseis prospecting using an array of vibroseis sources comprising:
    providing at least first and second vibroseis sources at different depths, wherein the at least first and second vibroseis sources constitute the array of vibroseis sources;
    emitting energy at a first frequency range from the first vibroseis source;
    substantially simultaneously emitting energy at a second frequency range from the second vibroseis source, wherein the first frequency range and the second frequency range are substantially different;
    providing at least a third vibroseis source at a different depth from the first and second vibroseis sources, wherein the at least first, second, and third vibroseis sources constitute an array of vibroseis sources;
    substantially simultaneously emitting energy at a third frequency range from the third vibroseis source, wherein the first frequency range, the second frequency range and the third frequency range are substantially different; and
    detecting the emitted energies.

11. A method of marine vibroseis prospecting comprising:
    providing at least first and second vibroseis sources;
    apportioning a desired frequency bandwidth between the first and second vibroseis sources; and
    emitting signals having the desired frequency bandwidth from the first and second vibroseis sources for a first period of time, wherein a total energy of the signals is substantially equal to or greater than an energy of a signal emitted by a single vibroseis source having the desired frequency bandwidth for a second period of time, and wherein the first period of time is substantially less than the second period of time.

12. The method of marine vibroseis prospecting of claim 11, wherein the desired frequency bandwidth is apportioned into lower and higher frequency bandwidths.

13. The method of marine vibroseis prospecting of claim 12, wherein the providing step further includes providing the first and second vibroseis sources at different depths.

14. The method of marine vibroseis prospecting of claim 11, wherein the desired frequency bandwidth spans from above 0 Hz to about 300 Hz.

15. The method of marine vibroseis prospecting of claim 11, further comprising:
providing additional vibroseis sources to the first and second vibroseis sources to form a multiplicity of vibroseis sources;
apportioning a desired frequency bandwidth between the multiplicity of vibroseis sources; and
emitting signals having the desired frequency bandwidth from the multiplicity of vibroseis sources for a third period of time, wherein a total energy of the signals is substantially equal to or greater than an energy of a signal emitted by a single vibroseis source having the desired frequency bandwidth for a second period of time, and wherein the third period of time is substantially less than the first and second periods of time.

16. An apparatus for emitting energy for marine vibroseis prospecting comprising:
a first vibroseis source to emit energy at a first frequency range for a first period of time; and
a second vibroseis source to emit energy at a second frequency range substantially simultaneously with the first vibroseis source and for a second period of time substantially the same as the first period of time, wherein the first frequency range and the second frequency range are substantially different and the first and second vibroseis sources are located at different depths, and wherein the total energy emitted from the first and second vibroseis is substantially equal to or greater than the energy emitted from one of the first and second vibroseis and the total period of time for emitting the total energy is substantially less than one of the first and second period of time.

17. The apparatus for emitting energy for marine vibroseis prospecting of claim 16, wherein the sum of the first and second frequency range spans from above 0 Hz to about 300 Hz.

18. The apparatus for emitting energy for marine vibroseis prospecting of claim 16, wherein the first period of time is between about 2 seconds and about 12 seconds.

19. An apparatus for emitting energy for marine vibroseis prospecting comprising:
a first vibroseis source to emit energy at a first frequency range for a first period of time; and
a second vibroseis source to emit energy at a second frequency range substantially simultaneously with the first vibroseis source and for a second period of time substantially the same as the first period of time, wherein the first frequency range and the second frequency range are substantially different, wherein the first frequency range is a low frequency range and the second frequency range is a higher frequency range and the first vibroseis source is provided at a lower depth than the second vibroseis source.

20. An apparatus for emitting energy for marine vibroseis prospecting comprising:
a first vibroseis source to emit energy at a first frequency range for a first period of time; and
a multiplicity of vibroseis sources substantially simultaneously emitting energy at a multiplicity of frequency ranges for a period of time substantially the same as the first period of time.

21. The method of marine vibroseis prospecting of claim 11, wherein the first period of time is substantially equal to the second period of time divided by the number of vibroseis sources provided.

22. The method of marine vibroseis prospecting of claim 12, wherein the signal emitted by the first vibroseis source has a low frequency bandwidth and the signal emitted by the second vibroseis has a higher frequency bandwidth.

23. The method of marine vibroseis prospecting of claim 22, wherein the first vibroseis source is provided at a lower depth than the second vibroseis source.

24. The method of marine vibroseis prospecting of claim 22, wherein the first vibroseis source is a size or stroke constrained vibrator that provides marginal low frequency energy and wherein emitting the signals further comprises non-linearly sweeping the signal from the first vibroseis source.

25. The method of marine vibroseis prospecting of claim 1, wherein the first vibroseis source is provided at a lower depth than the second vibroseis source.

26. A method of marine vibroseis prospecting using an array of vibroseis sources comprising:
providing at least first and second vibroseis sources at different depths, wherein the at least first and second vibroseis sources constitute the array of vibroseis sources, wherein the at least first vibroseis source is a size or stroke constrained vibrator that provides marginal low frequency energy;
emitting energy at a first frequency range from the first vibroseis source, wherein emitting the energy further comprises non-linearly sweeping the energy from the first vibroseis source; and
substantially simultaneously emitting energy at a second frequency range from the second vibroseis source, wherein the first frequency range and the second frequency range are substantially different.

27. An apparatus for emitting energy for marine vibroseis prospecting comprising:
a first vibroseis source to emit energy at a first frequency range for a first period of time; and
a second vibroseis source to emit energy at a second frequency range substantially simultaneously with the first vibroseis source and for a second period of time substantially the same as the first period of time, wherein the first frequency range and the second frequency range are substantially different and the first and second vibroseis sources are located at different depths, wherein the first and second frequency ranges are apportioned from a desired bandwidth and each of the first and second sources is configured to emit energy only at one of the first and second frequencies, respectively.

28. An apparatus for emitting energy for marine vibroseis prospecting comprising:
a first vibroseis source to emit energy at a first frequency range for a first period of time, wherein the first vibroseis source is a size or stroke constrained vibrator that is configured to provide marginal low frequency energy; and
a second vibroseis source to emit energy at a second frequency range substantially simultaneously with the first vibroseis source and for a second period of time substantially the same as the first period of time, wherein the first frequency range and the second frequency range are substantially different and the first and second vibroseis sources are located at different depths.

* * * * *